2,780,525

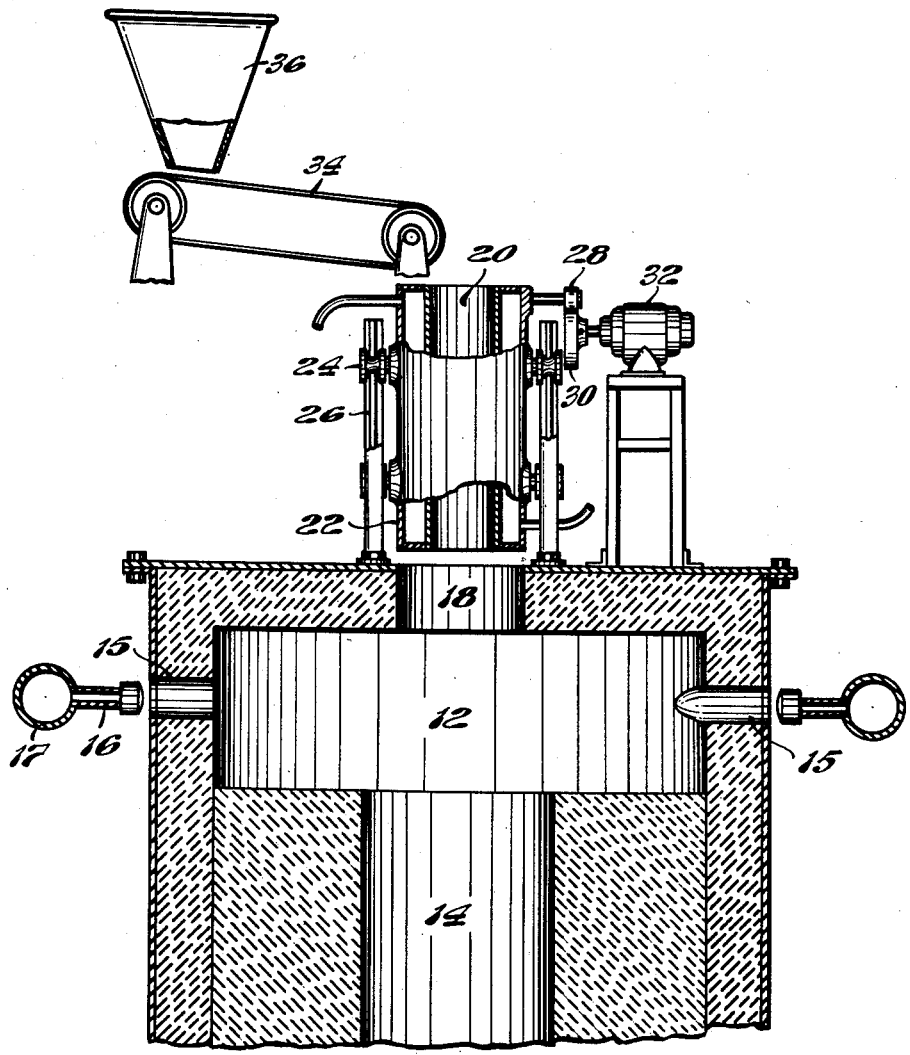

PROCESS AND APPARATUS FOR THE PRODUCTION OF ALUMINUM OXIDE FROM ALUMINUM CHLORIDE

Charles B. Wendell, Jr., Canton, and George E. Engelson, Nantasket, Mass., assignors to Godfrey L. Cabot, Inc., Boston, Mass., a corporation of Massachusetts Application October 8, 1953, Serial No. 384,854

10 Claims. (Cl. 23—142)

This invention relates to a process and apparatus for the production of aluminum oxide from aluminum chloride in the particulate solid state. In certain aspects this invention is an improvement over that described in copending application, Ser. No. 343,908, Dingman et al., filed March 23, 1953.

In said Dingman et al. application a process is described in which a particulate metal halide is transported in a stream of gas into a turbulent flame. While this method of introducing such raw material into a reaction zone is eminently practicable we have found that one member of the class of metal halides, i. e., aluminum chloride, is somewhat difficult to handle in this fashion at low rates of gas flow. It is not always desirable when producing certain grades of aluminum oxide to introduce large volumes of gas along with the aluminum chloride. Low gas flow rates can, of course, be employed if the gas is first thoroughly dried but drying adds expense to the process. So unless the volume of carrier gas is great in proportion to the amount of aluminum chloride suspended therein or unless the gas is thoroughly dried, the chloride tends to deposit on pipe walls and at the mouths of orifices, ultimately choking flow.

It is the principal object of our invention to provide a process and apparatus for producing aluminum oxide from solid particulate aluminum chloride.

It is a further object of this invention to provide a process and apparatus for introducing solid particulate aluminum chloride into a reaction zone for the conversion of the chloride to the oxide.

It is a further object of this invention to provide such a process and apparatus in which no carrier gas for the aluminum chloride is required.

The objects of our invention are accomplished by delivering particulate aluminum chloride at a controlled rate to the upper end of a suitably cooled vertically agitated tube of uniform diameter and flowing the material by gravity through the tube into a reaction zone wherein the chloride is converted to the oxide by hydrolysis or oxidation. All of the conditions recited have been found to be essential to prevent plugging of the feed tube. Aluminum chloride is extremely sticky when damp and hot, hence contact with the tube walls is to be avoided to the fullest extent possible. For example, we found that a funnel-shaped tube, even when cooled and agitated, tended to plug, as also did an uncooled and likewise a stationary tube.

Our invention will be better understood and appreciated from the following description thereof taken in connection with the accompanying drawing of a typical embodiment of the apparatus of the invention.

Reactor 10 is a heat insulated furnace, preferably cylindrical in shape, which may consist of a single chamber of uniform cross section or which preferably may be comprised of two chambers 12 and 14 of different sizes as shown. Suitable inlets, such as tangential ports 15 are provided in the side wall of chamber 12, hereinafter referred to as the combustion chamber, through which combustible hydrogen-containing and/or oxygen-containing gases are introduced. As shown, burners 16 supplied with combustible gas or gas pre-mixed with air through manifold 17 discharge into port 15. The reactor 10 is vertically disposed and has its inlet at the top and outlet at the bottom.

Centered in the inlet end wall of the reactor is an axial passage 18 of suitable cross sectional area. Positioned immediately thereabove and in axial alignment therewith is an aluminum chloride feed tube 20 having a jacket 22 for the circulation of a cooling fluid. Other means for cooling tube 20 may be employed if desired.

Tube 20 is supported in such a way that it can be agitated in a longitudinal direction. As illustrated guides 24 are secured to the wall of jacket 22 and are arranged to slide between pairs of tracks 26. The tracks thus direct the motion of the tube 20 and maintain the tube in alignment with inlet passage 18.

Any suitable means for vibrating the tube 20 in a longitudinal direction may be employed. As illustrated a spur 28 extending from the side of tube jacket 22 rests against the side of a cam 30 secured to the drive shaft of motor 32. The length of the stroke of tube 20 is easily adjusted by selection of a suitable cam.

Positioned above the inlet end of tube 20 and arranged to deliver its load thereinto is conveyor belt 34 supplied by conventional manner from feed hopper 36. Other means of feeding the tube will be apparent to anyone skilled in the art. We have also employed a vibrating conveyor of the Syntron type with excellent results. It is merely necessary that the feeding device be capable of delivering the particulate material at a substantially uniform rate.

The steps of the process of our invention are carried out typically as follows. A mixture of hydrogen-containing gas and more than sufficient of an oxygen-containing gas to completely burn the gas are introduced into chamber 12 through ports 15 and ignited. Aluminum chloride, preferably finely ground to a maximum particle size of about —40 mesh, is delivered to feed tube 20 at a rate determined by the capacity of reactor 10 and by the desired product quality. The flame developed in chamber 12 is highly turbulent and mixes rapidly with the $AlCl_3$. In the course of travel through chambers 12 and 14 the aluminum chloride is completely hydrolyzed to aluminum oxide and HCl. The reaction products are then delivered to conventional collection equipment which may advantageously consist of one or more cyclone separators and a filter in series in which the solid oxide product is separated from the gases. The HCl may be recovered or neutralized for discharge into the atmosphere.

In the following example are set forth data representative of numerous runs made in accordance with this invention.

$AlCl_3$ feed, lbs./hr_____ 25
Mass flow, C. F. M_____ 90
Combustible gas (city gas), C. F. M_____ 10
Air, C. F. M_____ 50
$Al_2O_3$ product:
    Milliequivalent _____ 0.1
    Surface area, $m.^2/g$_____ 95
    Av. particular diameter, A_____ 86
Feed tube 20, I. D., inches_____ 8 by 1¼
Airflow through tube, C. F. M_____ 18–20

It will be understood that numerous modifications in the above described process may be made without departing from the scope of our invention. Thus, instead of supplying a combustible mixture of hydrogen and oxygen-containing gases, we may introduce superheated steam through ports 15. Alternatively, we may heat reactor 10 externally and introduce oxygen or air alone through ports 15 or around the periphery of tube 20 through suitable headers.

Having thus described our invention, we claim:

1. A process for the production of aluminum oxide which comprises introducing solid particulate aluminum chloride by gravity at a controlled rate of flow into a hot reaction zone through a vertically disposed cold-walled zone of limited and uniform cross sectional area while maintaining the cold walls of said zone in reciprocating motion, simultaneously introducing into said hot reaction zone a gas, at least one constituent of which contains oxygen, converting the aluminum chloride while suspended in said gas in the reaction zone to aluminum oxide and separating the said oxide product from the gaseous by-products of the reaction.

2. The process of claim 1 in which the aluminum chloride is converted to the oxide by hydrolysis in the reaction zone.

3. The process of claim 1 in which the aluminum chloride is converted to the oxide by oxidation in the reaction zone.

4. A process for producing aluminum oxide which comprises continuously flowing solid aluminum chloride of minus 40 mesh particle size by gravity through a vertical, reciprocating, cooled cylindrical conduit into a reaction zone, simultaneously introducing into said reaction zone a hot gas, at least one constituent of which contains oxygen, converting the aluminum chloride to finely divided aluminum oxide by reaction with said gas and separating the said oxide product from the gaseous products of the reaction.

5. The process of claim 4 in which the hot gas is the product of burning a hydrogen-containing gas in an oxygen-containing gas.

6. The process of claim 4 in which the hot gas is steam.

7. The process of claim 4 in which the hot gas is oxygen.

8. Apparatus for producing aluminum oxide from solid particulate aluminum chloride comprising an enclosed reaction chamber, means to establish a hot gaseous thereof, a vertically-disposed jacketed cylindrical conduit atmosphere therein, a central inlet opening in the top thereof, a vertically-disposed jacketed cylindrical conduit the entire inner passage of which is unobstructed and of uniform cross-section movably mounted atop said reaction chamber concentrically with said opening with guiding means so as to permit movement of said conduit only in a vertical direction and while maintaining it in axial alignment with said opening, means to maintain said conduit in reciprocating vertical motion, means to supply cooling fluid to the jacket thereof, and means to deliver solid aluminum chloride in particulate form in controlled amount into the upper end on the inner passage of said conduit.

9. A process for producing aluminum oxide which comprises continuously delivering solid particulate aluminum chloride to a reaction zone by conducting said material thereinto through a vertically disposed, cooled conduit continuously reciprocated axially, simultaneously introducing into said reaction zone around the incoming aluminum chloride a hot gas containing water vapor under conditions such that rapid mixing of gas and aluminum chloride is effected, hydrolyzing the aluminum chloride to finely-divided solid aluminum oxide by reaction with said water vapor, and recovering the solid aluminum oxide from the gaseous reaction products.

10. The process of claim 9 in which the hot gas is obtained by burning a hydrogen-containing gas in air.

References Cited in the file of this patent

UNITED STATES PATENTS

| | | |
|---|---|---|
| 1,385,595 | Van Ranst | July 26, 1921 |
| 1,490,021 | Pedemonte | Apr. 8, 1924 |
| 2,122,241 | Arnold | June 28, 1938 |
| 2,413,709 | Hoffman | Jan. 7, 1947 |
| 2,653,078 | Lane | Sept. 22, 1953 |
| 2,663,620 | Haensel | Dec. 22, 1953 |

FOREIGN PATENTS

| | | |
|---|---|---|
| 304,289 | Great Britain | 1930 |
| 905,778 | France | Dec. 13, 1945 |
| 275,685 | Switzerland | Aug. 16, 1951 |